Sept. 23, 1941.  C. E. PERKINS  2,256,868
HYDRAULIC SHOCK ABSORBER CONTROL FOR RAILWAY TRUCKS
Filed Aug. 30, 1940  2 Sheets-Sheet 1
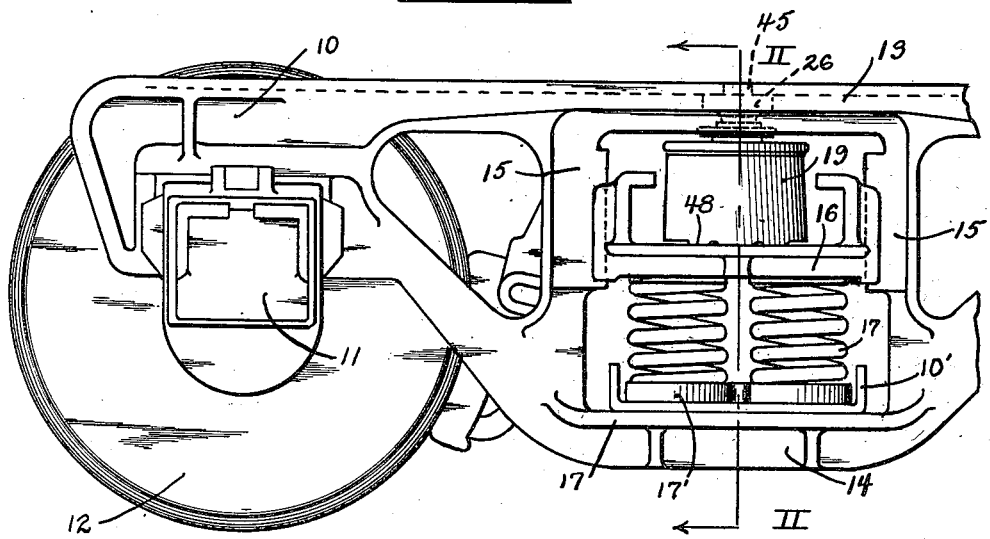
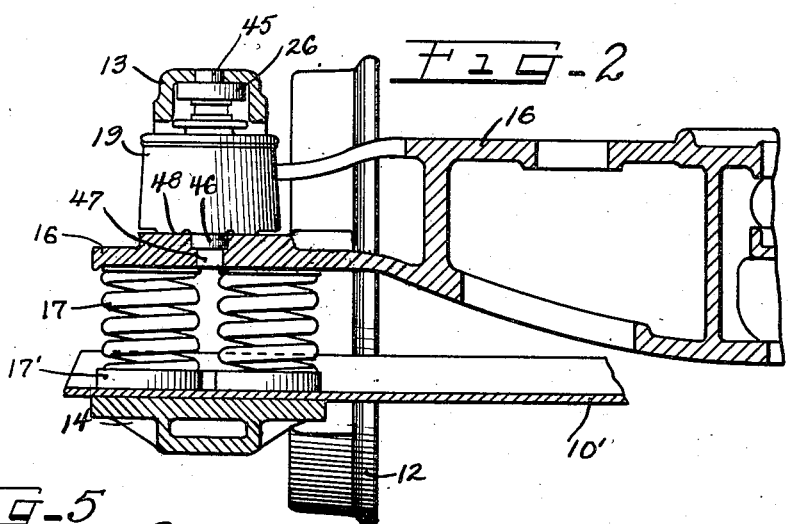
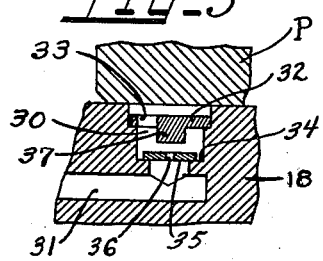
Inventor
Charles E. Perkins.
by Charles H. Hill Attys Sept. 23, 1941.  C. E. PERKINS  2,256,868
HYDRAULIC SHOCK ABSORBER CONTROL FOR RAILWAY TRUCKS
Filed Aug. 30, 1940  2 Sheets-Sheet 2
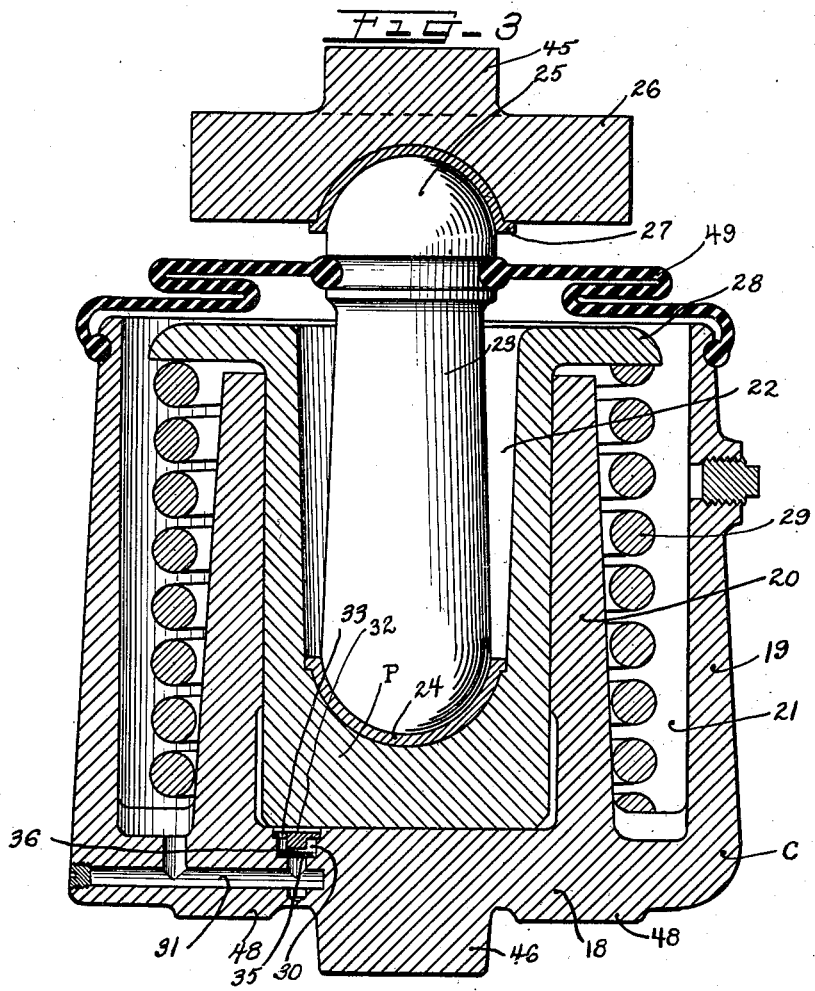
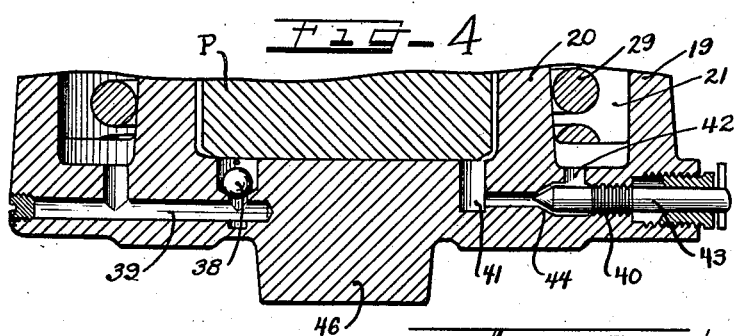
Inventor
Charles E. Perkins.
by Charles H. Hill Attys Patented Sept. 23, 1941

2,256,868

UNITED STATES PATENT OFFICE 2,256,868

HYDRAULIC SHOCK ABSORBER CONTROL
FOR RAILWAY TRUCKS

Charles E. Perkins, Buffalo, N. Y., assignor to
Houde Engineering Corporation, Buffalo, N. Y.,
a corporation of New York Application August 30, 1940, Serial No. 354,775

4 Claims. (Cl. 105—197)

My invention relates to hydraulic shock absorber control in railway cars, particularly the hydraulic control of the movement of the truck bolster relative to the truck frame.

During the past few years, railroads have speeded up freight trains, some of which are now operating at speeds as high as 85 miles per hour. The conventional four-wheel truck with cast steel side frames and coil spring supports for the bolsters reaches a critical period at about 30 miles per hour. At this speed vertical oscillations develop the amplitude of which, as a rule, increases with the increase of speed, resulting in overstressed and broken springs, general car failure, and damaged ladings. Shock absorbing devices have been supplied to function to damp vertical oscillation during the spring compression or down movement of the bolster, and while this would tend to break up vertical harmonics, it adds stiffness to the spring group so that too much of a load is transmitted through the frame to the wheel bearings and rails, as the springs are prevented from sufficiently absorbing such load impact. The main purpose of my invention is therefore to provide and apply hydraulic shock absorbing structure between the bolster and the top member of a truck frame for damping only the recoil movement of the bolster springs and to permit free compression movement of the springs, thus assuring maximum soft riding quality and the elimination of abnormal harmful stressing during the down movement of the bolster. In other words, the springs are allowed to freely compress under load impact and the stored energy is absorbed by the hydraulic structure during the rebound of the springs and upward movement of the bolster.

The improved arrangement also prevents to a high degree rolling of a car body on the trucks as too rapid return of the bolster to normal position is prevented by the hydraulic shock absorber structure.

An important object of the invention is to so construct the hydraulic device and mount it so that it will be located centrally over a spring group and will not tend to tip or twist the bolster, and will not interfere with lateral roll of the bolster in the truck frame.

Another important object is to provide an improved hydraulic shock absorber of the jack type, with the arrangement such that the shock absorbers may be readily inserted into service position between the bolster and the truck frame top wall without the use of bolts.

The various features of my invention are embodied in the structure shown on the drawings, in which drawings:

Figure 1 is a side elevation of a railway truck showing the shock absorbing structure applied thereto;

Figure 2 is a section on plane II—II of Figure 1;

Figure 3 is an enlarged vertical diametral section of a shock absorbing unit;

Figure 4 is a vertical section of the lower part of the hydraulic unit showing a modified fluid flow control arrangement; and Figure 5 is an enlarged section to more clearly show the arrangement and operation of the oil flow controlling means shown on Figure 3.

Referring to Figures 1 and 2, a conventional type of truck is shown, the ends 10 of each side frame engaging journal boxes 11 for the axles of wheels 12. Between the top wall 13 and the bottom wall 14 of each side frame extend the guide walls 15 for the bolster 16, a spring plank 10' extending between and being secured to the bottom walls 14 of the opposite side frames. As shown, a group of four coil springs 17 is provided in each side frame between the spring plank and the bolster, the four springs seating in a plate 17' which holds the four springs equidistant from a common vertical center line passing between the springs.

Referring to Figure 3, the hydraulic shock absorber shown comprises a cylinder structure C and a piston structure P. The cylinder structure comprises the base 18 from which extend upwardly the outer annular wall 19 and the inner annular wall 20, the wall 20 with the base 18 forming a cylinder space in which the piston P operates. The cylinder wall 20 is somewhat shorter than the wall 19 and the space 21 between the walls forms a fluid reservoir 21. The piston structure has the bore or recess 22 extending therethrough but terminating a distance short of the inner end thereof, this recess receiving the piston rod structure 23. The inner end of the piston rod is semi-spherical, and the piston at the inner end of the recess 22 is also semi-spherical to provide a seat on which is supported the bearing bushing 24 for the piston rod end.

At its outer end the piston rod terminates in a semi-spherical head 25 for engaging in a bearing block 26 against a bearing bushing 27 seated in the block. The ends of the piston rod are preferably hardened, and the seat bushings are also preferably hardened so as to prevent wear, the piston rod structure being preferably a drop forging of steel and the seating bushings being of material which will withstand heavy pressures.

The piston structure P at its outer end has the annular flange 28 extending radially across the end of the wall 20, a compression coil spring 29 within the reservoir space 21 being interposed between the flange 28 and the bottom or base 18 of the cylinder structure, this spring tending to separate the cylinder and piston structures.

For hydraulically controlling the relative movement of the cylinder and piston structures, suitable valving means is provided. As shown on Figures 3 and 5 the base 18 has a cylindrical valve chamber 30 communicating at its upper end with the cylinder space in which the piston operates, a passageway 31 extending between the valve chamber and the reservoir space 21. At its upper end the valve chamber is closed by a disc 32 having one or more fluid passageways 33 therethrough. At the bottom of the valve chamber is the annular seat or shoulder 34 for the valve disc 35 which normally overlies the end of the passageway 31. The outer diameter of the valve disc is less than the diameter of the valve chamber and at its center the valve disc has a metering orifice 36. When the cylinder and piston structures are moved axially apart, the suction created will cause the disc valve to be lifted from its seat, this lifting movement being limited by the abutment 37 on the wall 32. Fluid may now flow comparatively freely from the fluid reservoir 21 through the passageway 31 and around the valve disc into the valve chamber and from there through the passageway 33 in the wall 32 and into the cylinder, and substantially no hydraulic resistance is offered to the separation movement of the cylinder and piston structures. However, when the cylinder and piston structures are moved together after a separation movement thereof, the fluid within the cylinder will be forced outwardly through the passageway 33 into the valve chamber 30 and the valve 35 will be forced against its seat 34 so that only the restricted orifice 36 will be available for the return flow of the fluid from the cylinder space to the reservoir, the movement together of the cylinder and piston structures being thus correspondingly retarded or dampened.

Figure 4 shows a modified arrangement in which a valve may be adjusted from the exterior of the shock absorber for controlling the fluid flow for the desired shock absorbing action. In this modified arrangement a check valve which may be in the form of a ball 38 is interposed in the passageway 39 between the reservoir and the cylinder chamber, with the valve arranged to shut off flow from the cylinder chamber to the reservoir but permitting comparatively free flow in the opposite direction. In a radial bore 40 which communicates through passageway 41 with the cylinder chamber and through passageway 42 with the reservoir is interposed a valve 43 which may be of any suitable design. The valve shown is a simple needle valve whose point is cooperable with a seat 44 intermediate the passageways 41 and 42 for controlling the flow orifice. The valve has threaded engagement in the bore so that upon turning thereof adjustment for the orifice size is made.

Referring now to Figures 1 and 2, the abutment block 26 for the upper end of the piston rod is seated in the upper wall 13 of the truck side frame and held in place as by a lug 45. When the shock absorber structure is to be installed, the cylinder and piston structures thereof are brought together, and, while the bolster springs 17 are sufficiently compressed, the shock absorber structure may be slipped into place on the bolster end with the upper end of the piston rod engaging in the bearing bushing 27 of the abutment block 26 and with the base 18 resting on the bolster. When the shock absorber is in service position it will be centrally disposed over the spring group with its vertical axis coincident with the center line about which the springs are spaced, so that, when in service, it will not tend to tip or twist the bolster. To hold the shock absorber thus centrally disposed relative to the springs, its base 18 is provided with a depending boss 46 which engages in the passageway 47 in the bolster, and a number of bearing seats or points 48, preferably three, are provided for engaging the bolster so as to prevent rocking of the cylinder structure on the bolster.

Describing now the operation, when the spring group on a truck side frame is compressed by the downward movement of the bolster, the upward pressure of the bolster against the shock absorber will be released and the spring 29 in the shock absorber will follow up and shift down the cylinder structure C to maintain its engagement with the bolster and the piston structure P will be held in its raised position with the end of the piston rod against the abutment block 26. This relative movement of the shock absorber cylinder and piston parts will cause suction in the cylinder chamber and this suction will be relieved by flow of the hydraulic fluid from the reservoir 21 past the disc valves 35 and into the cylinder chamber, such flow being comparatively unrestricted so that the shock absorber will not interfere with the functioning and compression of the bolster springs under the load impact imposed thereon so that the springs will cushion this impact for gradual transmission thereof to the side frame, bearings and wheels. However, when the spring group recoils, the shock absorber cylinder structure will be returned to its upper position and the rate of such upward movement is controlled by the fluid flow, the fluid forced by the piston structure out of the cylinder chamber being entirely through the restricted orifice 36 of the valve in Figure 3, or through the restricted port controlled by the valve 43 when the arrangement shown on Figure 4 is used. The recoil of the bolster springs is thus damped and retarded and is gradually absorbed by the shock absorber. Thus, the bolster springs are free to function at all times with their full resiliency during compression thereof, and their rebound is absorbed by the hydraulic shock absorber.

With the piston rod 23 arranged for universal bearing engagement with the inner end of the piston, it has ample room to float to take care of the lateral movement of the bolster in the truck frame and side thrusts and wear are eliminated. As shown an oil-proof flexible boot or sealing structure 49 is secured around the piston rod and the upper end of the cylinder structure to insure against the leakage of fluid and to prevent dirt or foreign matter from getting into the shock absorber.

I have shown practical and efficient embodiment of my invention but I do not desire to be limited to the exact construction, arrangement and operation shown and described as modifications may be made without departing from the scope of the invention.

I claim as follows:

1. A hydraulic shock absorber for mounting on a railway truck side frame between the spring-supported end of the bolster and the top of the truck side frame, comprising a cylinder member adapted to seat on the bolster, a cup-shaped piston operable in said cylinder, a piston rod extending downwardly into said piston to seat against the bottom thereof and having its outer end adapted to abut the top wall of the side frame, a reservoir for hydraulic fluid, and valve means controlling the flow of fluid between said cylinder and reservoir upon relative axial movement of said cylinder and piston, said valve means being operable to retard the flow for inward movement of the piston but permitting comparatively free flow for outward movement of the piston.

2. A shock absorber for mounting on a railway truck side frame between the spring-supported end of the bolster and the top of the truck side frame, comprising a cylinder member adapted to seat on the bolster, a cup-shaped piston operable in said cylinder, a piston rod extending downwardly into said cylinder, said piston bottom having a semi-spherical bearing recess and the lower end of said piston rod being semi-spherical for seating in said recess whereby said piston is adapted for lateral swing, said piston at its upper end having a semi-spherical head for seating against the top of the truck side frame, a reservoir for hydraulic fluid, and valve means controlling the flow of fluid between said cylinder and said reservoir to thereby control the relative movements of said cylinder and piston.

3. A hydraulic control device for mounting on a railway truck side frame between the spring-supported end of the bolster and the top wall of the truck side frame for controlling the operation of the bolster-supporting spring, comprising a base for seating on the bolster and having inner and outer cylindrical walls defining a cylinder and a surrounding hydraulic fluid reservoir, a cup-shaped piston operable in said cylinder and having a semi-spherical bearing recess in its bottom, a piston rod extending into said piston and having a semi-spherical lower end for seating in said recess and having a semi-spherical head for seating against the truck side frame top wall, a spring in said reservoir engaging between said base and the outer end of said piston tending to hold said base against the bolster and the end of the piston rod against the truck side frame top wall, and valve means controlling the flow of fluid between said cylinder and said reservoir upon relative movement of said piston and cylinder to thereby control the relative movement of said bolster and side frame.

4. In a railway truck comprising side frames and a bolster supported at its ends by spring assemblies on the side frames, a control device for each spring assembly comprising a cylinder structure seated on the bolster end directly above and axially aligned with the spring assembly, a cup-shaped piston operable in said cylinder, a piston rod extending between the bottom of the piston and the top wall of the side frame, a fluid reservoir, valve means for controlling the flow of fluid between said cylinder and said reservoir whereby to control the movement of the bolster end relative to the side frame, means holding said cylinder structure against lateral displacement relative to the bolster end, said piston rod at its inner end having universal bearing engagement with the bottom of the piston and at its outer end having universal bearing engagement with the side frame top wall whereby said piston may readily follow lateral movement of the bolster in the side frame.

CHARLES E. PERKINS.